UNITED STATES PATENT OFFICE.

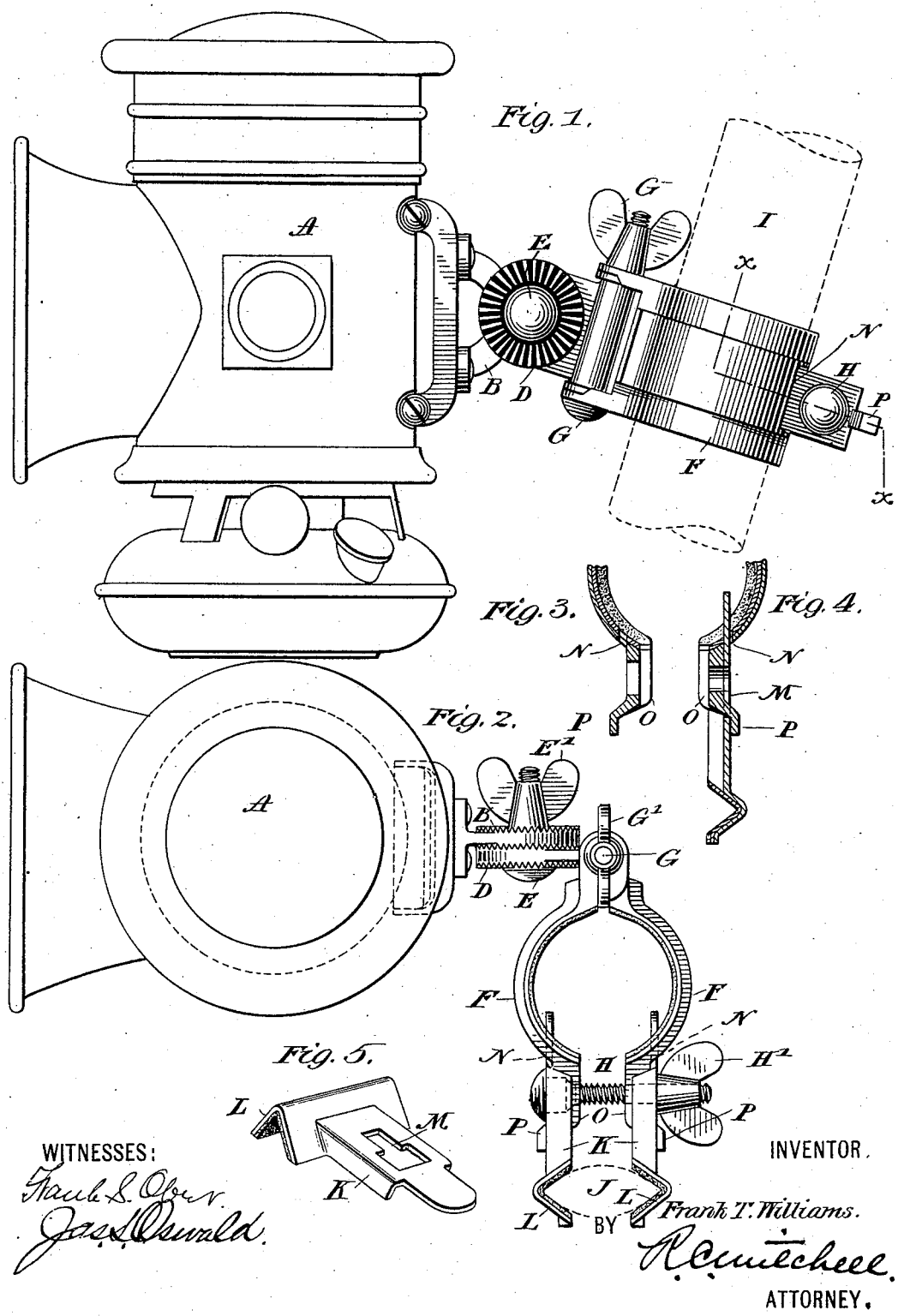

FRANK THEODORE WILLIAMS, OF MERIDEN, CONNECTICUT, ASSIGNOR TO THE EDWARD MILLER & COMPANY, OF SAME PLACE.

LAMP-BRACKET.

SPECIFICATION forming part of Letters Patent No. 576,769, dated February 9, 1897.

Application filed December 16, 1896. Serial No. 615,895. (No model.)

*To all whom it may concern:*

Be it known that I, FRANK THEODORE WILLIAMS, a citizen of the United States, residing at Meriden, in the county of New Haven and State of Connecticut, have invented certain new and useful Improvements in Lamp-Brackets, of which the following is a full, clear, and exact specification.

My invention relates to improvements in lamp-brackets; and it consists in the construction and arrangement of the parts thereof hereinafter fully described.

The object of my invention is to provide a means whereby a lamp may be held in firm engagement with the frame of a bicycle or other vehicle, the said bracket being provided with clamping members and supplemental parts therefor whereby the said clamping members have the universal capacity of being adapted to variously-formed parts of the frame.

My invention is illustrated by the accompanying drawings, in which—

Figure 1 is a side elevation of my device in one of its operative positions. Fig. 2 is a plan view of my invention as it appears in another position and provided with supplemental clamping parts. Fig. 3 is a section of a detail of the mechanism on line $x\,x$, Fig. 1. Fig. 4 is a section of Fig. 2 on the plane of the line $x\,x$, Fig. 1, illustrating the end of one of the clamping members only. Fig. 5 is a perspective view of a detail.

Similar letters refer to similar parts.

A is a lamp.

B is a lateral projection from the side of the lamp, affording a means for connecting the same to intermediate supporting-arm D. The faces of the parts B and D are by preference knurled or roughened, as shown, so that by means of a bolt E and nut E' the said parts B D may be held in a firm engagement with one another, as shown clearly in Fig. 2. The intermediate arm D is by preference also pivotally connected to the clamping members F F by means of the bolt G.

G' is a nut operating on said bolt G to afford a means for setting the parts in the desired lateral plane, the bolt G being by preference arranged in a substantially vertical plane, while the bolt E is arranged in a substantially horizontal plane, so that assuming the clamping-arms F F are secured in a desired position the lamp may be arranged at a suitable angle thereto to cause its rays of light to be directed in the path of travel of the vehicle. Suitable means are provided to draw the arms F F into engagement with a portion of the framework of the vehicle, the means illustrated being a bolt H and set-nut H'. The clamping members F may be shaped so as to be attached to a portion of the frame of any desired shape, for instance, such as illustrated in Fig. 1, in which I represents the tubular head of a bicycle.

To provide a means whereby the clamping members of the bracket may be attached to bodies of other shape than shown in Fig. 1, such as, for instance, shown in Fig. 2, in which J represents a front fork-blade of a bicycle, I provide supplemental detachable clamping-arms K K, which may be readily attached to the free ends of the main clamping members F F.

L L are jaws of somewhat angular formation toward the outer extremities of the supplemental clamps K.

M is a perforation formed in each of the clamps K at a point intermediate in their length.

N is a perforation toward the free extremity of each of the main clamping members F. The clamping members F are provided at their free extremities with extensions O O.

P P are overhanging shoulders or hooks, said hooks being raised slightly out of the plane of the extensions O O, as shown.

In attaching the supplemental clamps K K to the main members F F the extremities of the members K opposite the jaws L are inserted through the perforations N in the clamps F. (See Figs. 2 and 4.) The hooks P are passed through the perforations M in the clamps K, each of said clamps being then pushed rearwardly into the position shown in Figs. 2 and 4, in which the inner extremities of the clamps K project into the space between the clamping members F, and the hooks P overhang and engage the outer surface of the clamping members K. The perforations M in the last-named clamping members are sufficiently large to permit the bolt H to be passed through, as shown in Fig. 2, the presence of said bolt preventing the supplemental clamps K from becoming accidentally disengaged from the main clamps F.

As shown, the main clamping members F are particularly adapted to engage rounded surfaces, whereas the jaws of the detachable clamps K are particularly adapted to engage somewhat angular bodies, although manifestly I may give such conformity to either or both of said clamping members as may be desirable.

Suitable pads may be provided on the inner engaging surfaces of the jaws to prevent marring the finish of the frame of the vehicle.

In carrying out my invention some changes may be desirable, and I therefore do not limit myself to the specific form and arrangement shown, but hold myself at liberty to make such alterations as are fairly within the spirit and scope of my invention.

The capability of detachment of the supplemental arms from the main clamping-arms is a most useful feature where it is desired only to attach the bracket to a portion of the frame, such as the front frame-tube or head of the bicycle, in which only the main clamping members may be utilized, thus lightening the structure and removing an unsightly and then useless attachment upon which the clothing of the rider may become entangled or torn.

Having thus described my invention, what I claim is—

1. In a lamp-bracket for bicycles and other vehicles, main clamping-arms, supplemental clamping-arms detachably connected to the free extremity of the main clamping-arms and operating exteriorly thereof.

2. In a lamp-bracket for bicycles and other vehicles, main clamping-arms hinged or pivoted together, supplemental clamps detachably connected to the free extremities of the main clamping members and operating exteriorly thereof.

3. In a lamp-bracket for bicycles and other vehicles, main clamping-arms recessed to engage substantially rounded bodies and hinged or pivoted together, supplemental clamps having at their free extremities jaws for engaging substantially angular bodies and detachably connected to the free extremities of the main clamping members and operating exteriorly thereof.

4. In a lamp-bracket for bicycles and other vehicles main clamping-arms hinged or pivoted together, said clamping-arms being perforated at N and carrying hooks P, supplemental clamps having perforations intermediate their length and adapted to be detachably connected to the free extremities of the main clamping members and operating exteriorly thereof.

5. In a lamp-bracket for bicycles and other vehicles, main clamping-arms hinged or pivoted together at one end, said clamps having perforations N and carrying hooks P rearward of said perforations, supplemental clamping-arms having perforations intermediate their length detachably connected to the free extremities of the main clamping members and operating exteriorly of said main clamping members, an adjusting-bolt at the free ends of said clamping members and passing through said supplemental clamps when the latter are in engagement with said main clamping members, substantially as described.

FRANK THEODORE WILLIAMS.

Witnesses:
I. B. MILLER,
C. V. SUTLIFFE.